United States Patent
Sheng et al.

(10) Patent No.: US 9,347,459 B2
(45) Date of Patent: May 24, 2016

(54) ABRADABLE SEAL WITH AXIAL OFFSET

(75) Inventors: Nuo Sheng, Schenectady, NY (US); Roderick Mark Lusted, Niskayuna, NY (US); Vittorio Michelassi, Scandicci (IT)

(73) Assignee: Nuovo Pignone S.p.A., Florence (IT)

( * ) Notice: Subject to any disclaimer, the term of this patent is extended or adjusted under 35 U.S.C. 154(b) by 947 days.

(21) Appl. No.: 13/518,089

(22) PCT Filed: Dec. 7, 2010

(86) PCT No.: PCT/US2010/059258
§ 371 (c)(1),
(2), (4) Date: Nov. 16, 2012

(87) PCT Pub. No.: WO2011/078962
PCT Pub. Date: Jun. 30, 2011

(65) Prior Publication Data
US 2013/0142628 A1 Jun. 6, 2013

(30) Foreign Application Priority Data

Dec. 22, 2009 (IT) ............................. CO2009A0071

(51) Int. Cl.
*F04D 29/10* (2006.01)
*F04D 29/12* (2006.01)
(Continued)

(52) U.S. Cl.
CPC .............. *F04D 29/16* (2013.01); *F01D 11/003* (2013.01); *F01D 11/122* (2013.01); *F04D 29/102* (2013.01); *F04D 29/122* (2013.01); *F04D 29/162* (2013.01); *F16J 15/445* (2013.01)

(58) Field of Classification Search
CPC ... F01D 11/001; F01D 11/003; F01D 11/025; F04D 29/10; F04D 29/102; F04D 29/106; F04D 29/12; F04D 29/122; F04D 29/126; F04D 29/16; F04D 29/161; F04D 29/162; F04D 29/165; F04D 29/167; F16J 15/44; F16J 15/445
See application file for complete search history.

(56) References Cited

U.S. PATENT DOCUMENTS 5,297,928 A   3/1994   Imakiire et al.
6,012,723 A * 1/2000   Beeck ........................... 277/355
(Continued)

FOREIGN PATENT DOCUMENTS

EP   0899490 A2   3/1999
JP   2000130603 A   5/2000
(Continued)

OTHER PUBLICATIONS

Italian Search Report and Written Opinion dated Aug. 9, 2010 which was issued in connection with Italian Patent Application No. CO2009A000071 which was filed on Dec. 22, 2009.
(Continued)

*Primary Examiner* — Igor Kershteyn
*Assistant Examiner* — Christopher R Legendre
(74) *Attorney, Agent, or Firm* — GE Global Patent Operation (57) ABSTRACT

A sealing system for a centrifugal compressor includes a stator having a seal, a seal disposed in the seal housing and having an abradable portion along an inner circumference, a rotor having a plurality of rotor teeth configured to rotate within the inner circumference of the seal and configured to create rub grooves within the abradable portion, and a first spring disposed between the stator and the seal and configured to facilitate axial movement of the seal relative to the seal housing.

20 Claims, 5 Drawing Sheets

(51) Int. Cl.
    *F04D 29/16*   (2006.01)
    *F01D 11/00*   (2006.01)
    *F16J 15/44*   (2006.01)
    *F01D 11/12*   (2006.01)

(56) References Cited

U.S. PATENT DOCUMENTS

| | | | |
|---|---|---|---|
| 6,302,645 | B1 | 10/2001 | Kobayashi et al. |
| 6,663,739 | B2 | 12/2003 | Walker et al. |
| 6,786,488 | B2 * | 9/2004 | Laurello et al. ............... 277/355 |
| 7,052,017 | B2 * | 5/2006 | Uchida et al. ................. 277/420 |
| 7,287,956 | B2 * | 10/2007 | Bracken et al. ............ 415/173.3 |
| 8,794,918 | B2 * | 8/2014 | Ali et al. ...................... 415/230 |
| 8,864,443 | B2 * | 10/2014 | Narita et al. ................. 415/113 |
| 9,103,223 | B2 * | 8/2015 | Uehara ................. F01D 11/001 |
| 2004/0096319 | A1 | 5/2004 | Uchida et al. |
| 2006/0133928 | A1 | 6/2006 | Bracken et al. |
| 2006/0228209 | A1 | 10/2006 | Couture et al. |
| 2006/0237914 | A1 | 10/2006 | Li et al. |
| 2006/0267289 | A1 | 11/2006 | Li et al. |
| 2007/0132193 | A1 * | 6/2007 | Wolfe et al. ................... 277/415 |
| 2007/0248452 | A1 * | 10/2007 | Brisson et al. ................. 415/10 |
| 2012/0027582 | A1 * | 2/2012 | Natarajan et al. ............ 415/229 |
| 2012/0177484 | A1 * | 7/2012 | Lusted ................. F01D 11/003<br>415/173.4 |
| 2013/0142628 | A1 * | 6/2013 | Sheng et al. ................ 415/173.4 |
| 2015/0184531 | A1 * | 7/2015 | Baptista ................. F01D 25/16<br>415/230 |
| 2015/0337852 | A1 * | 11/2015 | Klingler ................. F04D 29/10<br>415/170.1 |

FOREIGN PATENT DOCUMENTS

| | | | |
|---|---|---|---|
| JP | 2007162482 A | * | 6/2007 |
| RU | 2006112029 A | | 11/2007 |
| SU | 1513157 A1 | | 10/1989 |

OTHER PUBLICATIONS

International Search Report and Written Opinion dated Oct. 2, 2011 which was issued in connection with PCT Patent Application No. US10/59258 which was filed on Dec. 7, 2010.

Unofficial English translation of Japanese Office Action issued in connection with corresponding JP Application No. 2012-545996 on Nov. 18, 2014.

Office Action issued in connection with corresponding KZ Application No. 2012/1578.1 on Dec. 11, 2013.

* cited by examiner

ABRADABLE SEAL WITH AXIAL OFFSET

CROSS REFERENCE TO RELATED APPLICATIONS

This is a national stage application under 35 U.S.C. §371(c) prior-filed, co-pending PCT patent application serial number PCT/US2010/059258, filed on Dec. 7, 2010, which claims priority to Italian Patent Application No. CO2009A000071, filed on Dec. 22, 2009, the entire contents of which are incorporated herein by reference.

BACKGROUND OF THE INVENTION

1. Field of the Invention

Exemplary embodiments relate generally to compressor seals and, more specifically, to the provision of abradable seals with axial offset for reducing leakage.

2. Description of the Prior Art

A compressor is a machine which increases the pressure of a compressible fluid, e.g., a gas, through the use of mechanical energy. Compressors are used in a number of different applications and in a large number of industrial processes, including power generation, natural gas liquification and other processes. Among the various types of compressors used in such processes and process plants are the so-called centrifugal compressors, in which the mechanical energy operates on gas input to the compressor by way of centrifugal acceleration, for example, by rotating a centrifugal impeller.

Centrifugal compressors can be fitted with a single impeller, i.e., a single stage configuration, or with a plurality of impellers in series, in which case they are frequently referred to as multistage compressors. Each of the stages of a centrifugal compressor typically includes an inlet conduit for gas to be compressed, an impeller which is capable of providing kinetic energy to the input gas and a diffuser which converts the kinetic energy of the gas leaving the impeller into pressure energy.

Figure 1:
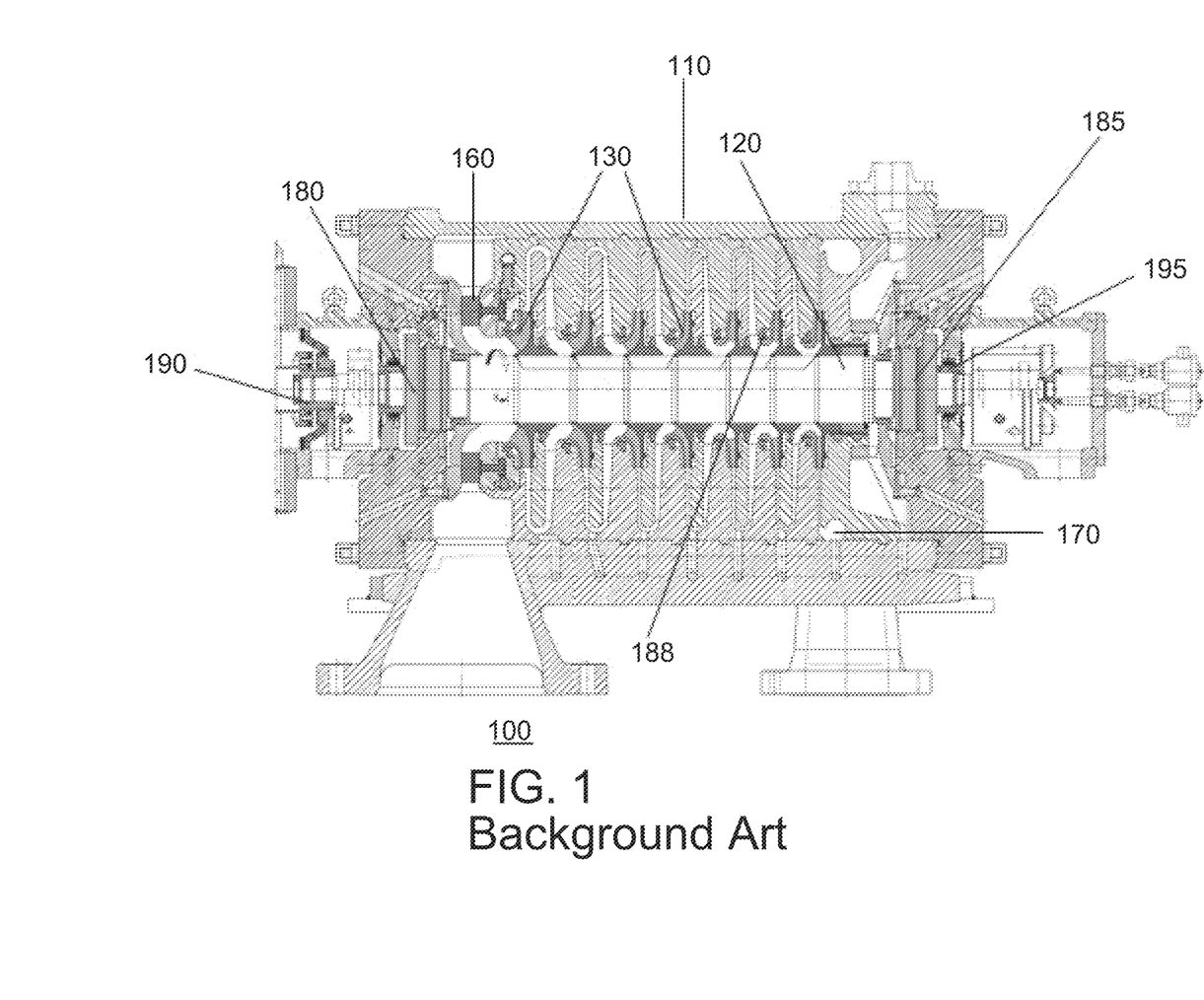
FIG. 1 illustrates a multistage compressor.

A multistage compressor 100 is illustrated in FIG. 1. Compressor 100 is included in casing 110 within which is mounted a shaft 120 and a plurality of impellers 130. The shaft 120 and impellers 130 are included in a rotor assembly that is supported through bearings 190 and 195.

The multistage compressor operates to take an input process gas from an inlet duct 160, to increase the process gas pressure through operation of the rotor assembly, and to subsequently expel the process gas through an outlet duct 170 at an output pressure which is higher than its input pressure. The process gas may, for example, be any one of carbon dioxide, hydrogen sulfide, butane, methane, ethane, propane, liquefied natural gas, or a combination thereof.

Seals or sealing systems 180, 185 and 188 are provided between impellers 130 and bearing 190 and 195 to prevent the process gas from flowing through to the bearings. Seals 188 are impeller eye seals.

Each of the impellers 130 increases the pressure of the process gas. Each of the impellers 130 may be considered to be one stage of the multistage compressor 100. Additional stages, therefore, result in an increase in the ratio of output pressure to input pressure.

The rotor assembly includes stationary portions known as stators and rotating portions known as rotors. The overall operating efficiency of a compressor is adversely affected by leakage flow of the working fluid or gas between the stator and rotor due to differential axial pressure of the rotor.

In centrifugal compressors, abradable seals can be used to reduce the leakage flow (of the working gas) to improve stage efficiency via clearance reduction without the risk of harming the rotor portion.

Figure 2:
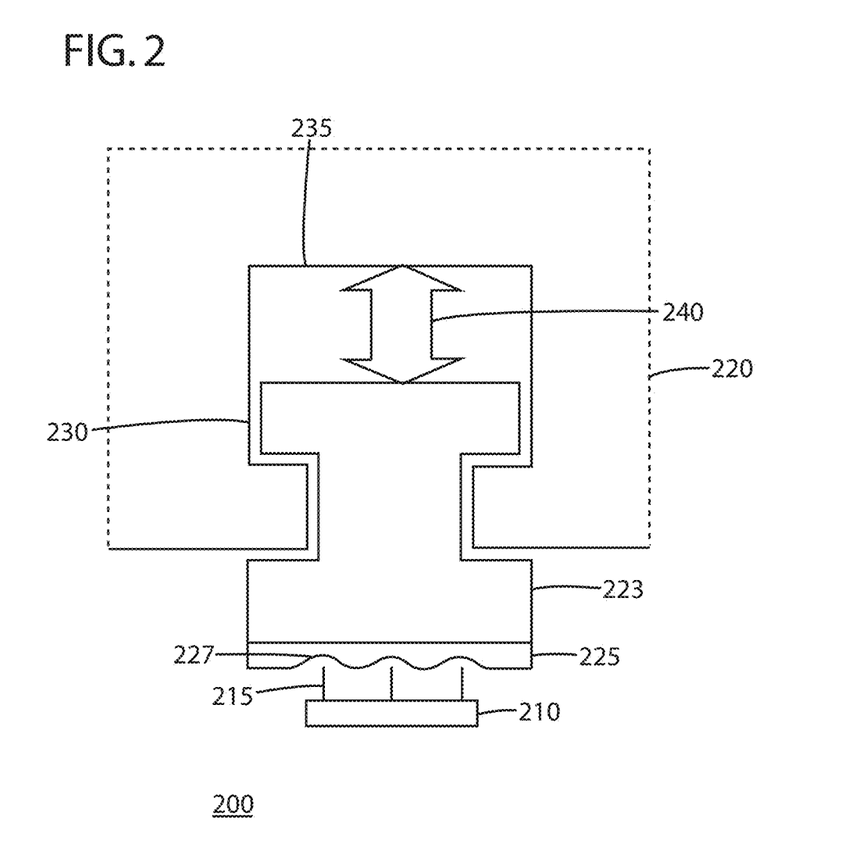
FIG. 2 illustrates a side view of a rotor/stator sealing assembly utilizing an abradable seal.

A sealing system using an abradable seal is illustrated in FIG. 2. Sealing system 200 includes a rotor 210 (i.e., a rotating portion) and a stator 220 (i.e., a stationary portion). Rotor 210 rotates around a longitudinal axis of the compressor. Rotor 210 includes a plurality of rotor teeth 215. Rotor teeth 215 can be radial. Stator 220 includes a cavity or housing 230 for housing a stator seal 223.

The stator seal includes an abradable portion or coating 225. Stator seal 223 can be an insert ring with an abradable coating on the inner circumference in some arrangements. In other arrangements, the (entire) insert ring can also be made of an abradable material.

The stator seal circumferentially encloses the rotor; the rotor can rotate within along the inner circumference of the stator seal. A stator seal is located on either side of each stage of a multistage compressor.

Rotation of the rotor 210 causes the rotor-mounted radial teeth 215 to create rub grooves 227 along the inner circumference of the stator-mounted abradable seal 223 and can cause debit (i.e., an increase in the leakage flow) to sealing performance.

In order to reduce leakage flow, a stator seal within housing 230 as illustrated in FIG. 2 can be offset radially from a top portion 235 of the housing 230 by a spring activated mechanism 240. The insert ring is typically partitioned into two or four equal sized sections. The spring activated mechanism permits the stator seal to radially move toward or away from the rotor 210. The two or four equal-sized section of the insert ring facilitate the radial movement.

Stator seal 223 with the spring activated mechanism may also be referred to as a compliant seal, a spring-backed seal or a spring-energized abradable seal. A compliant seal, when compared to a non-compliant seal (i.e., a seal not having a spring activated mechanism and hence no radial offset) provides a smaller radial clearance and a reduction in the leakage flow.

It would be desirable to design and provide an improved sealing mechanism for reducing the leakage flow debit further.

BRIEF SUMMARY OF THE INVENTION

Systems and methods according to these exemplary embodiments provide improved sealing characteristics to reduce leakage flow between a stator seal and a rotor of a rotor assembly by introducing a spring mechanism for facilitating axial positioning control over the seal.

According to an exemplary embodiment, a sealing system for a centrifugal compressor is disclosed. The sealing system includes a stator having a seal housing, a seal disposed in the seal housing and having an abradable portion along an inner circumference, a rotor having a plurality of rotor teeth configured to rotate within the inner circumference of the seal and configured to create rub grooves within the abradable portion, and a first spring disposed between the stator and the seal and configured to facilitate axial movement of the seal relative to the seal housing.

According to another embodiment, a method for reducing leakage flow between a seal housed within a stator seal housing and a rotor of a centrifugal compressor wherein the rotor rotates within an inner circumference of the seal is disclosed. The method includes biasing the seal toward a high pressure side of the seal housing by a spring load to create an axial gap between the seal and the seal housing, starting the compressor, cutting radial rub grooves in an abradable portion of the seal, increasing a speed of the compressor and moving the seal toward a low pressure side of the seal housing.

According to a further embodiment, a centrifugal compressor includes a stator having a seal housing, a seal disposed in the seal housing and having an abradable portion along an inner circumference, a rotor having a plurality of rotor teeth configured to rotate within the inner circumference of the seal and configured to create rub grooves within the abradable portion, a first spring disposed between the stator and the seal and configured to facilitate axial movement of the seal, and a secondary seal located between a lower pressure side of the housing and the seal.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

In exemplary embodiments, leakage flow between rotor teeth and stator rub grooves in a rotor assembly may be reduced by employing a pressure activated mechanism to achieve active axial positioning control of the rotor teeth relative to the rub grooves.

A computational fluid dynamics (CFD) analysis of rub groove impact indicates that teeth/groove axial positioning plays an important role in leakage performance. An axial offsetting of rotor teeth after initial formation of the grooves may reduce the performance debit.

Figure 3:
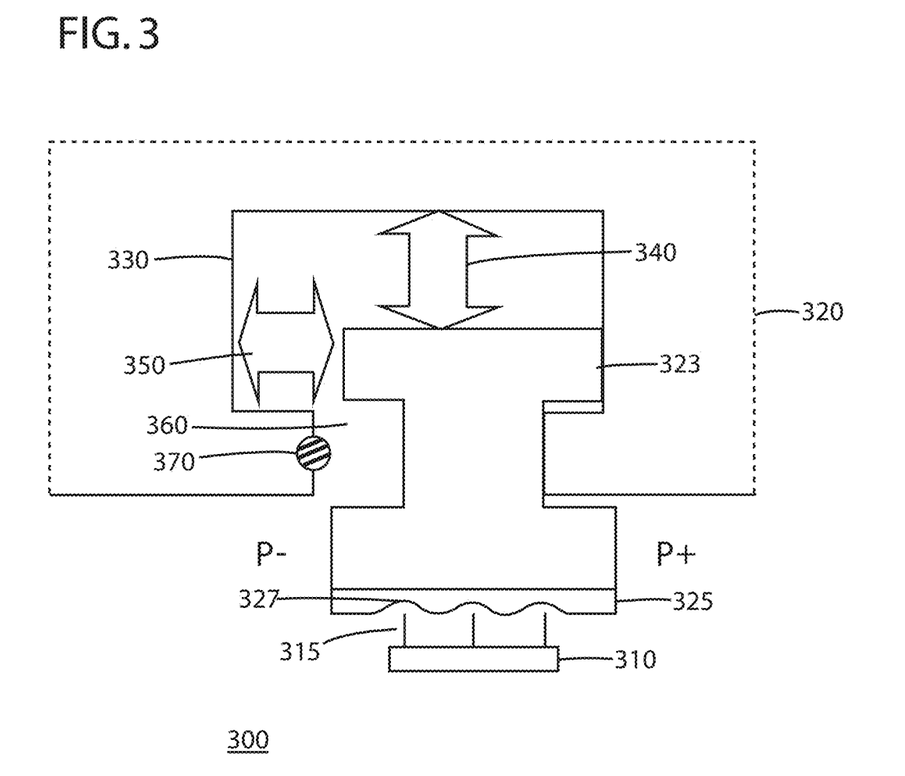
FIG. 3 illustrates a side view of a rotor/stator sealing assembly utilizing an abradable seal according to exemplary embodiments in an initial state.

Exemplary embodiments may utilize a pressure-activating mechanism to achieve active axial positioning control of the rotor teeth relative to the rub groove as illustrated in sealing system 300 FIG. 3. Sealing system 300 may include rotor 310 and stator 320. Rotor 310 may include a plurality of rotor teeth 315 which may be radial. Stator 320 may include a stator seal 323 located within a seal housing 330.

As described above, the stator seal may include an abradable portion or coating 325. Stator seal 323 may include an insert ring (two or more portions) with an abradable coating on the inner circumference in some arrangements. The insert ring may be made of steel. The abradable coating on the inner circumference may be a porous metallic material such as porous Aluminum, Cobalt or Nickel-based thermally sprayed coatings; it may alternatively be plastic-based (e.g., Teflon, Polyester).

In other arrangements, the (entire) insert ring may also be made of an abradable material. The abradable material may be Fluorosint-500, a mica-reinforced Teflon for example.

Stator seal 323 may be placed within housing 330 and offset radially from a top portion 335 of the housing by a spring activated mechanism 340. Rotor teeth 315 may create rub grooves 327 in the abradable stator portion 325. In exemplary embodiments, an axial gap 360 may be created or designed between stator seal 320 and seal housing 330 by the use of an axially oriented spring 350.

While being assembled, stator seal 323 may be pushed (or set) to the high(er) pressure side (P+) of housing 330 by the axially oriented spring 350. Spring 350 may be placed between seal 323 and the low(er) pressure side (P−) of housing 330. Spring 350 may be in its or slightly compressed state at this time. The axially oriented spring 350 may bias the stator seal 323 toward the higher pressure side.

During the usage, at start-up (i.e., when the pressure ratio is low), rotor teeth 315 may cut into abradable portion 325 during critical vibration and create rub grooves 327. At start up speeds, the difference in pressure (between P+ and P−) is relatively low making it possible to maintain the position of the seal at the higher pressure side. Rotor teeth 315 may ride in the middle of rub grooves 327 at these speeds and stator seal position.

Figure 4:
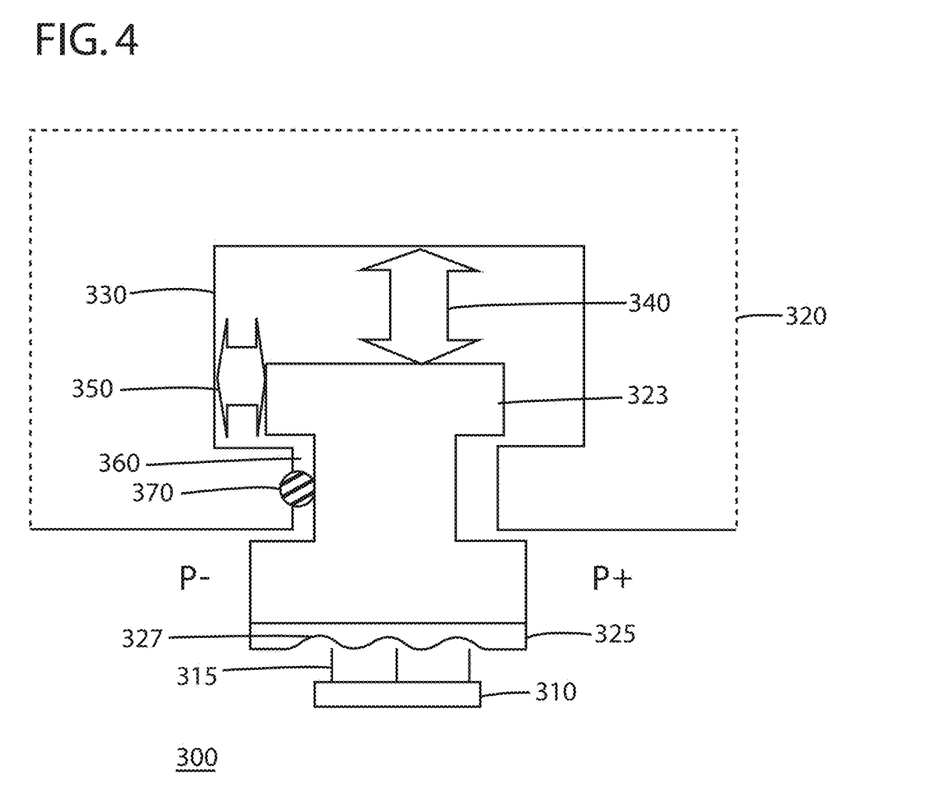
FIG. 4 illustrates a side view of a rotor assembly utilizing an abradable seal according to exemplary embodiments in an operating state.

At design speed, the pressure differential (between P+ and P−) increases. As illustrated in FIG. 4, the increased pressure ratio across seal 323 from the high pressure (or P+) side may force seal 323 to move axially towards the low pressure (or P−) side. Spring 350 may start to contract (i.e., not in its original state) as the pressure increases.

This axial movement (from the higher pressure side P+ to the lower pressure side P−) forms a smaller or tighter gap between rotor teeth 315 and rub grooves 327. Rotor teeth 315 are not riding in the middle of the rub grooves 327 as illustrated.

The spacing between the (tips of the) rotor teeth and the part of the abradable portion facing the rotor teeth of FIG. 4 is smaller in relation to the spacing between the rotor teeth and the middle of rub grooves of FIG. 3. The amount of leakage may be decreased as a result. The leakage can be controlled by spring stiffness and operating pressure ratio.

A secondary seal may also be included between seal 323 and seal housing 330 in some embodiments to provide a further reduction in leakage as illustrated in FIGS. 3 and 4. Referring to FIG. 4, secondary seal 370 may block leakage between seal 323 and seal housing 330 at design speed. Secondary seal 370, therefore, further reduces the leakage.

While the axial offset as described in exemplary embodiments may be additional to the radial offset, the axial offset may be implemented by itself (i.e., without the radial offset) in some embodiments. The axial offset reduces the radial gap and reduces leakage debit in either (i.e., with or without radial offset) arrangements.

Figure 5:
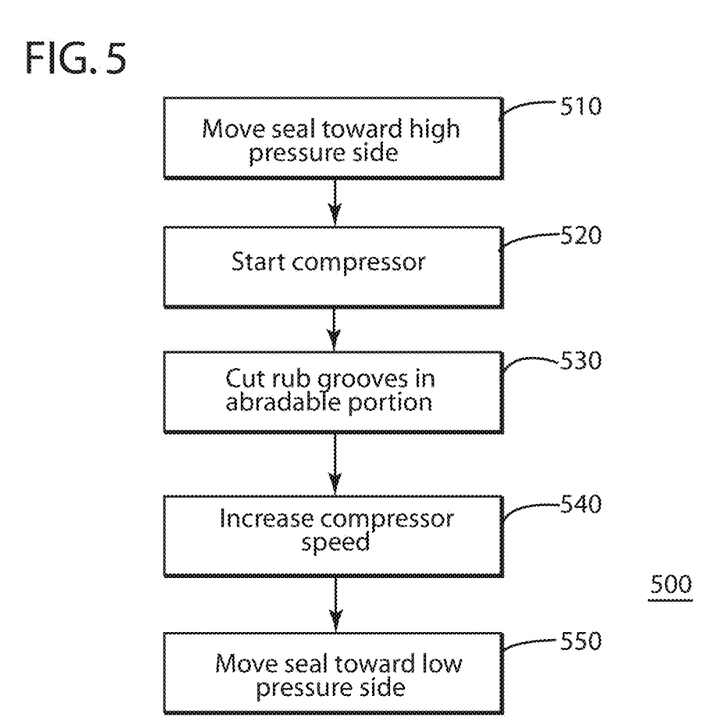
FIG. 5 illustrates a method in accordance with exemplary embodiments.

A method 500 in accordance with exemplary embodiments may be described with reference to FIG. 5. During assembly, an axial gap may be created between a seal and seal housing of a centrifugal compressor at 510 by moving the seal toward a high pressure side of the housing utilizing an axially oriented spring (in its original or slightly compressed state). The compressor may be started at 520. Rotor teeth may cut rub grooves in the stator seal abradable portion at 530.

The compressor speed (and hence, pressure) may be increased at 540. As the compressor operates toward the design speed, the seal spring may become compressed with increased pressure and the seal moves toward the low pressure side at 550. The gap between rotor teeth and the abradable portion may decrease and secondary seal may provide additional leakage protection as described above.

CFD analysis demonstrates that axial rub-groove positioning of the abradable seal, achieved by pressure-activating mechanism in exemplary embodiments, increases sealing performance.

Exemplary embodiments are directed to axial positioning control of the abradable seal design. While previous efforts have focused on minimizing radial clearance between rotor teeth and abradable seal, embodiments as described herein introduce a pressure-activated axial positioning mechanism, which leads to minimizing the sealing gap independent of compressor critical vibration or thermal transients.

Exemplary embodiments as described herein provide multiple advantages. A sealing system according to exemplary embodiments reduces leakage caused by rub grooves to a non-compliant abradable seal. The system also optimizes performance of the compliant (spring-energized) abradable seal for an impeller eye of a centrifugal compressor.

Centrifugal compressor stage efficiency can be improved by providing an active axial-positioning mechanism as described in exemplary embodiments to achieve a minimum sealing gap.

In some embodiments, a plurality of axial positioning mechanisms may be provided in the stator seal. The plurality of axial positioning mechanisms may be distributed (or spaced apart) equally along the seal for example.

The axial-positioning mechanism according to exemplary embodiments is not limited to implementation in new compressors. Existing compressors with seal rings can be retrofitted with the axial-positioning mechanism. Furthermore, while the active-positioning mechanism of exemplary embodiments has been described with respect to centrifugal compressors, it may be equally applicable to turbo machines in general.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A sealing system for a centrifugal compressor comprising:
    a stator having a seal housing;
    a seal disposed in the seal housing and having an abradable portion along an inner circumference;
    a rotor having a plurality of rotor teeth configured to rotate within the inner circumference of the seal and configured to create rub grooves within the abradable portion; and
    a first spring, in an expanded state, disposed between the seal and a low pressure side of the seal housing before starting the centrifugal compressor for biasing the seal towards a high pressure side of the seal housing, wherein after starting the centrifugal compressor, the first spring is configured to facilitate axial movement of the seal from the high pressure side of the seal housing towards the low pressure side of the seal housing by compressing the first spring towards the low pressure side of the seal housing in response to a predetermined increased pressure ratio across the seal.

2. The sealing system of claim 1, wherein the rotor teeth are oriented in a radial direction.

3. The sealing system of claim 1, wherein the first spring biases the seal axially towards the high pressure side of the seal housing at startup of the centrifugal compressor.

4. The sealing system of claim 3, wherein the seal is configured to move towards the low pressure side of the seal housing at a design speed of the centrifugal compressor.

5. The sealing system of claim 4, wherein the first spring is in a compressed state at design speeds of the centrifugal compressor.

6. The sealing system of claim 1, further comprising:
    a secondary seal located between the low pressure side of the seal housing and the seal.

7. The sealing system of claim 1, further comprising:
    a second spring between the seal and the seal housing and configured to provide radial movement of the seal.

8. The sealing system of claim 7, wherein the second spring is in an expanded position during operation of the centrifugal compressor.

9. The sealing system of claim 8, wherein the second spring is configured to reduce a radial distance between the seal and the rotor.

10. The sealing system of claim 1, wherein the seal is an insert ring.

11. The sealing system of claim 10, wherein the insert ring is made of steel and the abradable portion is made of porous metallic material.

12. The sealing system of claim 1, wherein the seal is an insert ring made of abradable material.

13. A method for reducing leakage flow between a seal housed within a stator seal housing and a rotor of a centrifugal compressor wherein the rotor rotates within an inner circumference of the seal, the method comprising:
    biasing the seal towards a high pressure side of the seal housing by disposing a spring in an expanded state between the seal and a low pressure side of the seal housing before starting the centrifugal compressor to create an axial gap between the seal and the seal housing;
    starting the centrifugal compressor;
    cutting radial rub grooves in an abradable portion of the seal;
    increasing a speed of the centrifugal compressor; and
    moving the seal from the high pressure side of the seal housing towards the low pressure side of the seal housing by compressing the expanded spring towards the low pressure side in response to a predetermined increased pressure ratio across the seal.

14. The method of claim 13, further comprising:
    providing radial movement of the seal by a second spring disposed between the seal and the seal housing.

15. The method of claim 14, wherein the second spring is in an expanded position during operation of the centrifugal compressor and is configured to reduce a radial distance between the seal and the rotor.

16. The method of claim 13, further comprising:
    providing a secondary seal between the low pressure side of the seal housing and the seal.

17. A centrifugal compressor comprising:
    a stator having a seal housing;
    a seal disposed in the seal housing and having an abradable portion along an inner circumference;

a rotor having a plurality of rotor teeth configured to rotate within the inner circumference of the seal and configured to create rub grooves within the abradable portion;

a first spring, in an expanded state, disposed between the seal and a low pressure side of the seal housing before starting the centrifugal compressor for biasing the seal towards a high pressure side of the seal housing, wherein after starting the centrifugal compressor, the first spring is configured to facilitate axial movement of the seal from the high pressure side of the seal housing towards the low pressure side of the seal housing by compressing the first spring towards the low pressure side of the seal housing in response to a predetermined increased pressure ratio across the seal; and a secondary seal located between the low pressure side of the seal housing and the seal.

18. The centrifugal compressor of claim 17, further comprising:

a second spring between the seal and the seal housing and configured to provide radial movement of the seal.

19. The centrifugal compressor of claim 18, wherein the second spring is in an expanded position during operation of the centrifugal compressor.

20. The centrifugal compressor of claim 19, wherein the second spring is configured to reduce a radial distance between the seal and the rotor.

* * * * *